United States Patent
Soloway

(10) Patent No.: US 9,771,629 B2
(45) Date of Patent: Sep. 26, 2017

(54) METHODS FOR MARKING AND MARKED ARTICLES USING ADDITIVE MANUFACTURING TECHNIQUE

(71) Applicant: GENERAL ELECTRIC COMPANY, Schenectady, NY (US)

(72) Inventor: Daniel David Soloway, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/750,652

(22) Filed: Jun. 25, 2015

(65) Prior Publication Data

US 2016/0376674 A1  Dec. 29, 2016

(51) Int. Cl.
*C21D 9/00* (2006.01)
*B23K 26/342* (2014.01)
(Continued)

(52) U.S. Cl.
CPC .......... *C21D 9/0068* (2013.01); *B22F 3/1055* (2013.01); *B22F 3/24* (2013.01);
(Continued)

(58) Field of Classification Search
CPC ....................................................... F01D 5/286
(Continued)

(56) References Cited

U.S. PATENT DOCUMENTS

| 4,724,299 A * | 2/1988 | Hammeke ............. B05B 7/1486 |
| | | 219/121.6 |
| 2002/0102360 A1* | 8/2002 | Subramanian .......... C23C 24/04 |
| | | 427/419.1 |

(Continued)

FOREIGN PATENT DOCUMENTS

EP  1295960 A2 *  3/2003  ............... C23C 8/02

OTHER PUBLICATIONS

Richter H.K., "Laser Material Processing in the Aero Engine Industry. Established, Cutting-Edge and Emerging Applications," Proceedings of the 3rd Pacific International Conference on Application of Lasers and Optics, Jan. 1, 2008, pp. 1-6.

(Continued)

*Primary Examiner* — Leslie J Evanisko
*Assistant Examiner* — Quang X Nguyen
(74) *Attorney, Agent, or Firm* — McNees Wallace & Nurick LLC

(57) ABSTRACT

A method for marking an article is disclosed which includes providing an article including a substrate, the substrate including a surface and a surface material, and forming a design on the surface of the substrate by applying a marking material to the surface wherein applying the marking material includes an additive manufacturing technique. Another method for marking an article further includes the surface having a first surface and second surface, the second surface defining a depression relative to the first surface, and forming a design on the surface of the substrate by applying a marking material to the second surface, the marking material forming a marking surface which is substantially flush with the first surface. The marked article formed by the methods includes a microstructure derived from the additive manufacturing technique.

19 Claims, 3 Drawing Sheets

(51) Int. Cl.
    *B23K 26/70*       (2014.01)
    *C21D 1/00*        (2006.01)
    *B22F 3/24*        (2006.01)
    *C23C 24/04*      (2006.01)
    *B22F 3/105*      (2006.01)
    *B41M 3/14*       (2006.01)
    *B41M 5/26*       (2006.01)
    *B33Y 10/00*      (2015.01)
    *B33Y 80/00*      (2015.01)

(52) U.S. Cl.
    CPC ............ *B23K 26/342* (2015.10); *B23K 26/70* (2015.10); *B41M 3/14* (2013.01); *B41M 5/262* (2013.01); *C21D 1/00* (2013.01); *C23C 24/04* (2013.01); *B22F 2003/247* (2013.01); *B22F 2003/248* (2013.01); *B33Y 10/00* (2014.12); *B33Y 80/00* (2014.12)

(58) Field of Classification Search
    USPC ......................................................... 101/483
    See application file for complete search history.

(56) References Cited

U.S. PATENT DOCUMENTS

| | | | |
|---|---|---|---|
| 2002/0166896 A1* | 11/2002 | Mazumder | G06K 1/121 235/487 |
| 2004/0202886 A1* | 10/2004 | Subramanian | C23C 4/18 428/632 |
| 2013/0071562 A1* | 3/2013 | Szuromi | B22F 3/1055 427/237 |
| 2013/0202192 A1 | 8/2013 | Telfer et al. | |
| 2014/0277669 A1* | 9/2014 | Nardi | G05B 19/042 700/103 |
| 2015/0122774 A1 | 5/2015 | Fernandez Ciurleo et al. | |
| 2016/0160341 A1* | 6/2016 | Miller | C23C 24/04 204/192.1 |
| 2016/0313139 A1* | 10/2016 | Klecka | G01D 5/14 |

OTHER PUBLICATIONS

Extended European Search Report and Opinion issued in connection with corresponding EP Application No. 16174328.1 dated Nov. 24, 2016.

* cited by examiner

METHODS FOR MARKING AND MARKED ARTICLES USING ADDITIVE MANUFACTURING TECHNIQUE

FIELD OF THE INVENTION

The present invention is directed to methods for marking and marked articles. More particularly, the present invention is directed to methods for marking with additive manufacturing techniques and articles marked by additive manufacturing techniques.

BACKGROUND OF THE INVENTION

Certain articles, such as gas turbine components, jet engine components, and internal combustion engine component, are subjected to conditions which erode, mask or destroy marks produced by many common marking techniques, for example, by oxidation of a marked surface. Other common marking techniques, such as stamping, cause undesirable stress risers which can weaken the article being marked. Some common marking techniques result in a surface which is not sufficiently flush for certain applications.

BRIEF DESCRIPTION OF THE INVENTION

In an exemplary embodiment, a method for marking an article includes providing an article including a substrate, the substrate including a surface and a surface material, and forming a design on the surface of the substrate by applying a marking material to the surface wherein applying the marking material includes an additive manufacturing technique.

In another exemplary embodiment, a method for marking an article, includes providing an article including a substrate, the substrate including a surface and a surface material, wherein the surface includes a first surface and second surface, the second surface defining a depression relative to the first surface, and forming a design on the surface of the substrate by applying a marking material to the second surface, the marking material forming a marking surface, the marking surface being substantially flush with the first surface. Applying the marking material includes an additive manufacturing technique.

In another exemplary embodiment, a marked article, includes a substrate including a surface and a surface material, and a design on the surface of the substrate, the design including a marking material. The marking material includes microstructure derived from an additive manufacturing technique.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided are exemplary marked articles and methods for marking articles. Embodiments of the present disclosure, in comparison to methods and products not utilizing one or more features disclosed herein, improve readability of markings on articles subjected to rigorous operating conditions such as high temperatures and oxidizing environments, improve the durability of markings, decrease structural impairments, and improve surface flushness.

Figure 1:
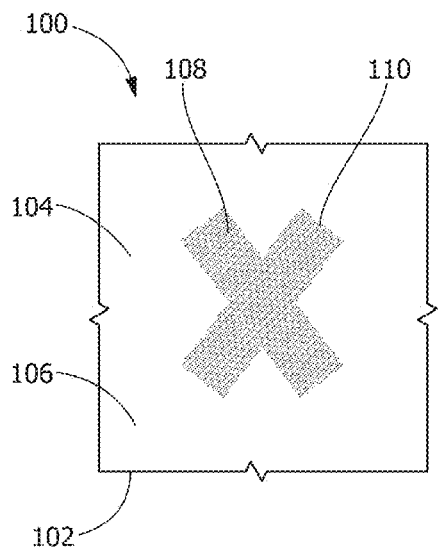
FIG. 1 is a front view of a marked article, according to an embodiment of the present disclosure.

Referring to FIG. 1, an article 100 includes a substrate 102 having a surface 104 and a surface material 106. The article is marked with a marking material 108, forming a design 110. The article 100 is any suitable article. In one embodiment, the article may be a gas turbine component, a steam turbine component, an aviation jet engine component, an internal combustion engine component, a turbine shroud, a turbine blade, a turbine nozzle, a turbine wheel, a near flow pass seal, a compressor blade, a combustion sub-system component, a fuel nozzle, a combustion can, a liner, a transition piece, a cap, or combination thereof.

The surface material 106 may be any suitable material, including, but not limited to, a metal, an alloy, a ceramic, a ceramic matrix composite, a thermal barrier coating, a nickel-based superalloy, a steel, a MCrAlY, a fiber glass composite, a carbon composite, a rock, a mineral, a chromium-molybdenum, a chromium-molybdenum-vanadium, or a combination thereof.

The marking material 108 may be any suitable material, including, but not limited to, a metal, an alloy, a ceramic, a ceramic matrix composite, a thermal barrier coating, a nickel-based superalloy, a steel, a MCrAlY, a fiber glass composite, a carbon composite, a rock, a mineral, a chromium-molybdenum, a chromium-molybdenum-vanadium, or a combination thereof. The marking material 108 is perceptible as distinct from the surface material 106. The distinction between the marking material 108 and the surface material 106 may be discernable by a human sensory organ or may be imperceptible to a human sensory organ. The distinction between the marking material 108 and the surface material 106 may also be discernable by a sensor. The basis for distinguishing between the marking material 108 and the surface material 106 may be any suitable sensory basis, including, but not limited to visual perception, optical perception, electromagnetic perception, tactile perception, radiological perception, chemical perception, magnetic perception, audial perception, thermal perception, electro perception, vibrational perception, or combinations thereof. Optical, visual or electromagnetic perception may include perception of electromagnetic radiation having a wavelength from about 380 to about 750 nm ("visible light"). Alternatively, optical perception or electromagnetic perception may include perception of ultraviolet radiation or infrared radiation. In one embodiment, the marking material 108 and the surface material 106 include indicia visually perceptible to the human eye as a color differential.

Applying the marking material 108 to form the design may include any suitable additive manufacturing technique, including, but not limited to, cold spraying, direct metal laser sintering, selective laser melting, selective laser sintering, or combinations thereof.

The design 110 may be any suitable design, including, but not limited to a bar code, a matrix bar code, a quick response code (QR code), a data matrix code, a proprietary code, a triangular code, a numeric bar code, an alpha-numeric bar code, a 2-dimensional bar code, a symbol, a written character, a letter, a numeral, an alphanumeric, a glyph, a pictogram, a syllabogram, a logogram, or a combination thereof.

Referring to FIG. 1, in one embodiment, the article 100 is marked by applying the marking material 108 to the surface 104 of the substrate 102 of the article 100 by an additive manufacturing technique, defining a design 110. In a further embodiment, the marking material 108 is a thin layer, having a thickness of less than about 0.5 mm, alternatively less than about 0.2 mm, alternatively less than about 0.1 mm, alternatively less than about 0.05 mm, alternatively less than about 0.02 mm.

Figure 2:
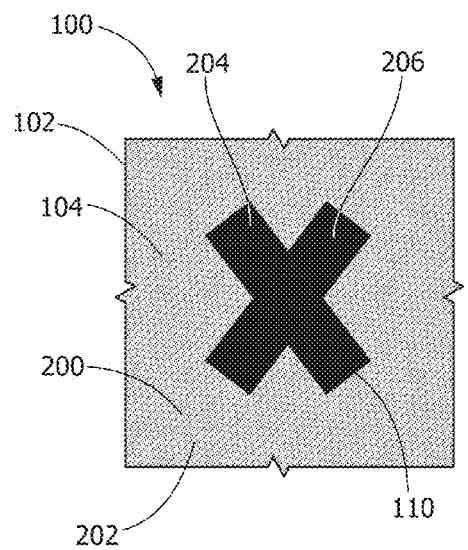
FIG. 2 is a front view of the marked article of FIG. 1 following oxidation, according to an embodiment of the present disclosure.

Referring to FIG. 2, in one embodiment, the surface material 106 and the marking material 108 are oxidized or tempered to form an oxidized surface material 200 and an oxidized marking material 204. The oxidized marking material 204 includes oxidized marking indicia 206 distinct from the oxidized surface indicia 202 of the oxidized surface material 200. The distinction between the oxidized surface indicia 202 and the oxidized marking indicia 206 may be discernable by a human sensory organ or may be imperceptible to a human sensory organ. Additionally, the distinction between the oxidized surface indicia 202 and the oxidized marking indicia 206 may be discernable by a sensor. The basis for distinction between the oxidized surface indicia 202 and the oxidized marking indicia 206 may be any suitable sensory basis. In one embodiment, the oxidized surface indicia 202 and the oxidized marking indicia 206 are visually perceptible to the human eye as a color differential. The marking material 108 may be a metal or alloy which oxidizes to a distinctive color, such as, but not limited to, aluminum, copper, titanium, or combinations thereof.

Figure 3:
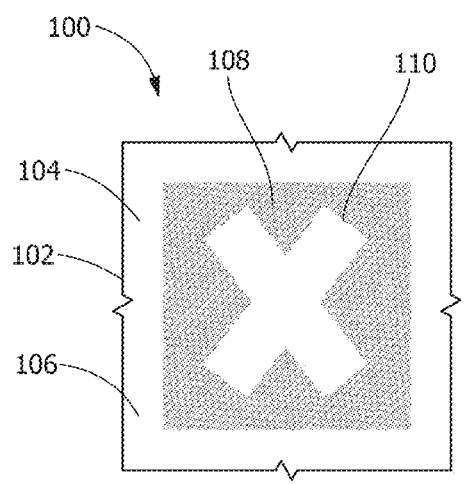
FIG. 3 is a front view of a marked article, according to an embodiment of the present disclosure.
Figure 4:
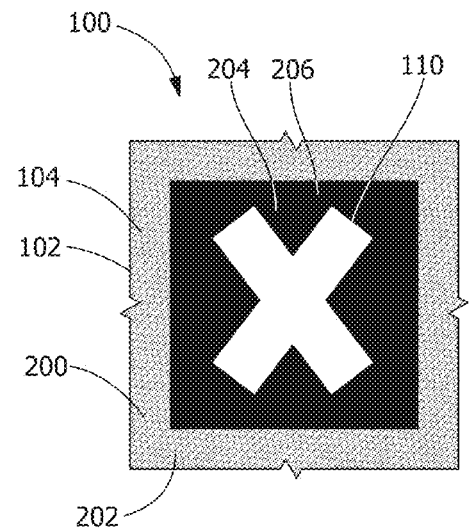
FIG. 4 is a front view of the marked article of FIG. 3 following oxidation, according to an embodiment of the present disclosure.

Referring to FIG. 3, in one embodiment, the design 110 is defined by the absence of the marking material 108. Referring to FIG. 4, the design 110 following oxidation or tempering may also be defined by the absence of the oxidized marking material 204. In one embodiment, the marking material 108 is applied so as to leave a portion of the surface material 106. In another embodiment, a portion of the marking material 108 is removed from the surface 104 following initial application by any suitable technique, including, but not limited to, machining.

Figure 5:
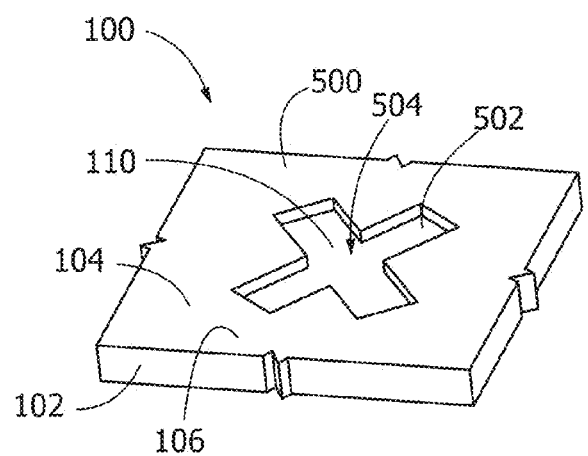
FIG. 5 is a perspective view of an article, according to an embodiment of the present disclosure.

Referring to FIG. 5, the article 100 may include a first surface 500 and a second surface 502, wherein the second surface 502 defines a depression 504 relative to the first surface 500 in the surface 104 of the substrate 102. The depression 504 may be formed by any suitable technique, including, but not limited to, coining, forging, pressing, stamping, etching, machining, casting, or a combination thereof.

Figure 6:
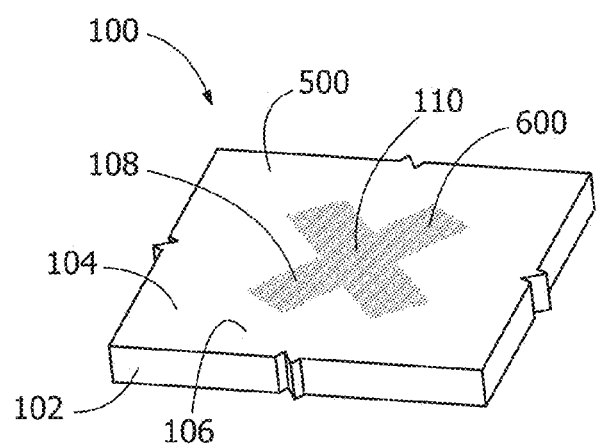
FIG. 6 is a perspective view of the article of FIG. 5 following marking, according to an embodiment of the present disclosure.

Referring to FIG. 6, in one embodiment, the design 110 is formed by applying the marking material 108 to the second surface 502 (as shown in FIG. 5) by any suitable additive manufacturing technique, including, but not limited to, cold spraying, direct metal laser sintering, selective laser melting, selective laser sintering, or combinations thereof. Applying the marking material 108 to the second surface 502 forms a marking surface 600. In a further embodiment, the marking surface 600 is substantially flush with the first surface 500. As used herein, "substantially flush" indicates that the marking surface 600 and the first surface 500 do not vary significantly from the overall conformation of surface 104, and that where marking surface 600 and first surface 500 meet, the variance in height relative to one another does not exceed operational tolerances for the article 100, and in no case exceeds about 25 nm to about 75 nm, alternatively about 50 nm. The marking surface 600 and the first surface 500 may be substantially flush as a result of the applying of the marking material 108, or, the surface 104 may be further modified in order to render the marking surface 600 and the first surface 500 substantially flush following deposition of the marking material 108. Further modification of the surface 104 to achieve substantial flushness may include, but is not limited to, machining or polishing, or a combination thereof.

Figure 7:
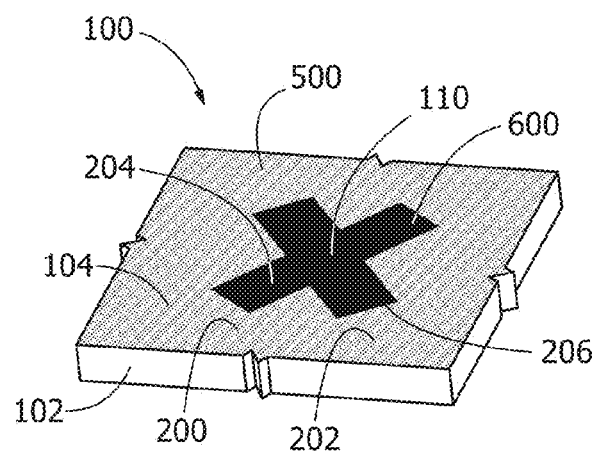
FIG. 7 is a perspective view of the article of FIG. 6 following oxidation, according to an embodiment of the present disclosure.

Referring to FIG. 7, in one embodiment, the surface material 106 and the marking material 108 are oxidized or tempered to form an oxidized surface material 200 and an oxidized marking material 204. The oxidized marking material 204 includes oxidized marking indicia 206 distinct from the oxidized surface indicia 202 of the oxidized surface material 200. The distinction between the oxidized surface indicia 202 and the oxidized marking indicia 206 may be discernable by a human sensory organ or may be imperceptible to a human sensory organ. Additionally, the distinction between the oxidized surface indicia 202 and the oxidized marking indicia 206 may be discernable by a sensor. In one embodiment, the oxidized surface indicia 202 and the oxidized marking indicia 206 are visually perceptible to the human eye as a color differential. The marking material 108 may be a metal or alloy which oxidizes to a distinctive color, such as, but not limited to, aluminum, copper, titanium, or combinations thereof.

Figure 8:
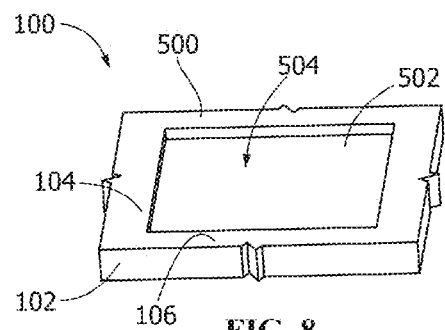
FIG. 8 is a perspective view of an article, according to an embodiment of the present disclosure.
Figure 9:
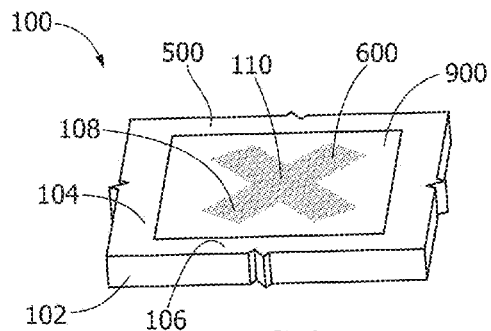
FIG. 9 is a perspective view of the article of FIG. 8 following marking, according to an embodiment of the present disclosure.
Figure 11:
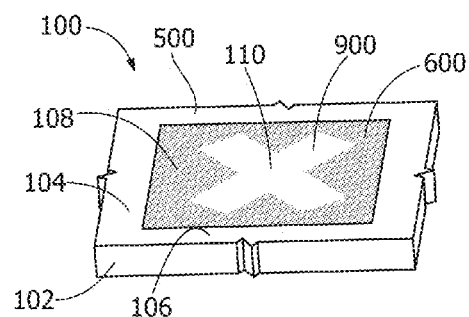
FIG. 11 is a perspective view of the article of FIG. 8 following marking, according to an embodiment of the present disclosure.
Figure 12:
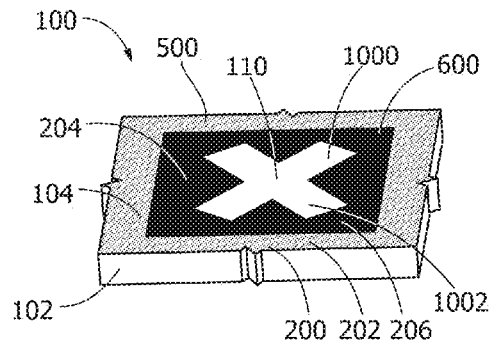
FIG. 12 is a perspective view of the article of FIG. 11 following oxidation, according to an embodiment of the present disclosure.

Referring to FIG. 8, in contrast to FIG. 5, wherein the depression 504 substantially conforms to the contours of the ultimate design 110, in an alternate embodiment, the depression 504 does not substantially conform to the contours of the design 110. In this embodiment, referring to FIGS. 9 and 11, a contrast material 900 is applied in addition to the marking material 108, such that the marking material 108, the contrast material 900 and, optionally, the surface material 106 define the design 110. Referring to FIG. 9, in one embodiment the design 110 may be formed of the marking material 108. Referring to FIG. 11, in another embodiment, the design 110 may be defined by the absence of the marking material 108.

The contrast material 900 may be any suitable material, including, but not limited to, a metal, an alloy, a ceramic, a ceramic matrix composite, a thermal barrier coating, a nickel-based superalloy, a steel, a MCrAlY, a fiber glass composite, a carbon composite, a rock, a mineral, a chromium-molybdenum, a chromium-molybdenum-vanadium, or a combination thereof. The contrast material 900 may be the same material as the surface material 106 or may be a different material than the surface material 106.

The contrast material 900 is perceptible as distinct from the marking material 108. The distinction between the contrast material 900 and the marking material 108 may be discernable by a human sensory organ or may be imperceptible to a human sensory organ. The distinction between the contrast material 900 and the marking material 108 may also be discernable by a sensor. The basis for distinction between the contrast material 900 and the marking material 108 may be any suitable sensory basis. In one embodiment, the contrast material 900 and the marking material 108 include indicia visually perceptible to the human eye as a color differential.

Applying the contrast material 900 may include any suitable additive manufacturing technique, including, but not limited to, cold spraying, direct metal laser sintering, selective laser melting, selective laser sintering, or combinations thereof.

Figure 10:
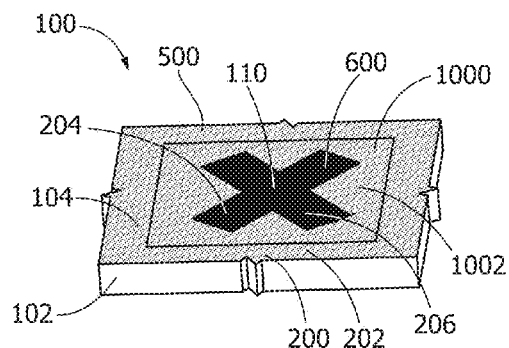
FIG. 10 is a perspective view of the article of FIG. 9 following oxidation, according to an embodiment of the present disclosure.

Referring to FIGS. 10 and 11, the surface material 106, the marking material 108 and the contrast material 900 are oxidized or tempered to form an oxidized surface material 200, an oxidized marking material 204 and an oxidized contrast material 1000. The oxidized marking material 204 includes oxidized marking indicia 206 distinct from the oxidized surface indicia 202 of the oxidized surface material 200 and the oxidized contrast indicia 1002 of the oxidized contrast material 1000. The distinction between the oxidized surface indicia 202 and the oxidized marking indicia 206 and the oxidized contrast indicia 1002 may be discernable by a human sensory organ or may be imperceptible to a human sensory organ. Additionally, the distinction between the oxidized surface indicia 202 and the oxidized marking indicia 206 and the oxidized contrast indicia 1002 may be discernable by a sensor. In one embodiment, the oxidized surface indicia 202, the oxidized contrast indicia 1002 and the oxidized marking indicia 206 are visually perceptible to the human eye as a color differential. The marking material 108 may be a metal or alloy which oxidizes to a distinctive color, such as, but not limited to, aluminum, copper, titanium, or combinations thereof.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for marking an article, comprising:
   providing the article including a substrate, the substrate including a surface and a surface material;
   forming a design on the surface of the substrate by applying a marking material to the surface; and
   oxidizing or tempering the marking material and the surface material to form an oxidized marking material and an oxidized surface material, the oxidized marking material having an oxidized marking indicia distinct from an oxidized surface indicia of the oxidized surface material,
   wherein applying the marking material includes cold spraying.

2. The method of claim 1, wherein the design is selected from the group consisting of bar codes, matrix bar codes, quick response codes (QR codes), data matrix codes, proprietary codes, triangular codes, numeric bar codes, alphanumeric bar codes, 2-dimensional bar codes, symbols, written characters, letters, numerals, alphanumerics, glyphs, pictograms, syllabograms, logograms, and combinations thereof.

3. The method of claim 1, wherein the article is a turbine component.

4. The method of claim 1, wherein the oxidized marking indicia is distinct from the oxidized surface indicia on the basis of a differential in the infrared, visible light, or ultraviolet spectra.

5. The method of claim 4, wherein the oxidized marking indicia is distinct from the oxidized surface indicia as a color differential perceptible to the human eye.

6. A method for marking an article, comprising:
   providing the article including a substrate, the substrate including a surface and a surface material, wherein the surface includes a first surface and second surface, the second surface defining a depression relative to the first surface;
   forming a design on the surface of the substrate by applying a marking material to the second surface, the marking material forming a marking surface, the marking surface being substantially flush with the first surface; and
   oxidizing or tempering the marking material and the surface material to form an oxidized marking material and an oxidized surface material, the oxidized marking material having an oxidized marking indicia distinct from an oxidized surface indicia of the oxidized surface material,
   wherein applying the marking material includes an additive manufacturing technique.

7. The method of claim 6, wherein the additive manufacturing technique is cold spraying.

8. The method of claim 6, wherein the additive manufacturing technique is selected from the group consisting of direct metal laser sintering, selective laser melting, selective laser sintering, and combinations thereof.

9. The method of claim 6, wherein the design is selected from the group consisting of bar codes, matrix bar codes, quick response codes (QR codes), data matrix codes, proprietary codes, triangular codes, numeric bar codes, alphanumeric bar codes, 2-dimensional bar codes, symbols, written characters, letters, numerals, alphanumerics, glyphs, pictograms, syllabograms, logograms, and combinations thereof.

10. The method of claim 6, wherein forming the design includes machining the marking surface to be substantially flush with the first surface following application of the marking material to the second surface.

11. The method of claim 6, wherein the article is a turbine component.

12. The method of claim 6, wherein the oxidized marking indicia is distinct from the oxidized surface indicia on the basis of a differential in the infrared, visible light, or ultraviolet spectra.

13. The method of claim 12, wherein the oxidized marking indicia is distinct from the oxidized surface indicia as a color differential perceptible to the human eye.

14. A marked article, comprising:
a substrate including a surface and a surface material; and
a design on the surface of the substrate, the design including a marking material,
wherein the marking material includes a cold sprayed microstructure, and
wherein the marking material includes a property of oxidizing or tempering to an oxidized marking material having an oxidized marking indicia distinct from an oxidized surface indicia of an oxidized surface material formed by oxidizing or tempering the surface material.

15. The article of claim 14, wherein the design is selected from the group consisting of bar codes, matrix bar codes, quick response codes (QR codes), data matrix codes, proprietary codes, triangular codes, numeric bar codes, alphanumeric bar codes, 2-dimensional bar codes, symbols, written characters, letters, numerals, alphanumerics, glyphs, pictograms, syllabograms, logograms, and combinations thereof.

16. The article of claim 14, wherein the surface includes a first surface and second surface, the second surface defining a depression relative to the first surface, the marking material filling the depression and including a marking surface, the marking surface being substantially flush with the first surface.

17. The article of claim 14, wherein the article is a turbine component.

18. The article of claim 14, wherein the oxidized marking indicia is distinct from the oxidized surface indicia on the basis of a differential in the infrared, visible light, or ultraviolet spectra.

19. The article of claim 18, wherein the oxidized marking indicia is distinct from the oxidized surface indicia as a color differential perceptible to the human eye.

* * * * *